United States Patent [19]

Takeshima et al.

[11] Patent Number: 4,936,909

[45] Date of Patent: Jun. 26, 1990

[54] PROCESS FOR PRODUCING FINE PARTICULATE METALS

[75] Inventors: Eiki Takeshima; Masaki Sato; Yoshihisa Ieguchi; Akira Sakakura, all of Chiba, Japan

[73] Assignee: Nisshin Steel Co., Ltd., Tokyo, Japan

[21] Appl. No.: 391,612

[22] PCT Filed: Nov. 17, 1988

[86] PCT No.: PCT/JP88/01158

§ 371 Date: Jul. 13, 1989

§ 102(e) Date: Jul. 13, 1989

[87] PCT Pub. No.: WO89/04736

PCT Pub. Date: Jun. 1, 1989

[30] Foreign Application Priority Data

Nov. 20, 1987 [JP] Japan .................... 62-293144

[51] Int. Cl.$^5$ .................... B22F 9/18; B22F 9/24
[52] U.S. Cl. .................... 75/364
[58] Field of Search .................... 75/0.5 A

[56] References Cited

U.S. PATENT DOCUMENTS

| 2,663,633 | 12/1953 | Crowley et al. | 75/0.5 BA |
| 3,679,399 | 7/1972 | Linton et al. | 75/0.5 A |
| 3,694,185 | 9/1972 | Kunda et al. | 75/0.5 A |
| 4,191,557 | 3/1980 | Kondis | 75/0.5 A |
| 4,659,373 | 4/1987 | Bogdanovi | 75/0.5 A |
| 4,713,110 | 12/1987 | Bogdanovic | 75/0.5 A |

FOREIGN PATENT DOCUMENTS

| 3541633 | 5/1987 | Fed. Rep. of Germany | 75/0.5 A |
| 60-141809 | 7/1985 | Japan | 75/0.5 A |
| 0248230 | 12/1969 | U.S.S.R. | 75/0.5 A |
| 1079361 | 3/1984 | U.S.S.R. | 75/0.5 A |

Primary Examiner—John P. Sheehan
Assistant Examiner—David W. Schumaker
Attorney, Agent, or Firm—Wenderoth, Lind & Ponack

[57] ABSTRACT

Proposed herein is a process for producing fine particulate metals comprising reducing fine powder of at least one iron compound selected from the group consisting of iron oxide, iron sulfate and iron chloride with a reducing gas to provide fine particulate iron having a particle size of from 0.1 to 3.0 μm and a specific surface area of from 2.0 to 4.0 m$^2$/g, and bringing the fine particulate iron in contact with an aqueous solution containing ions of at least one metal selected from the group consisting of nickel, tin, lead, cobalt, copper and silver thereby forming fine powder of at least one of above-mentioned metals having a particle size of from 0.1 to 3.0 μm in the aqueous solution.

2 Claims, 1 Drawing Sheet

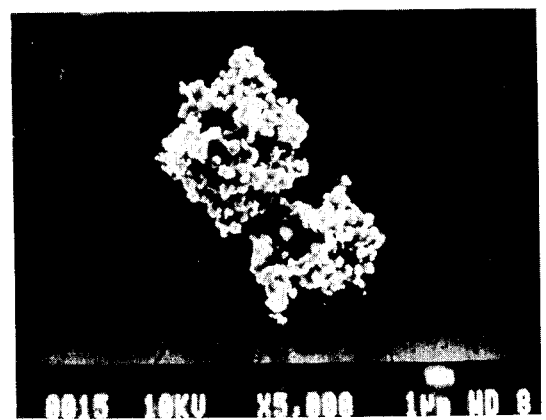
FIG. I

4,936,909

PROCESS FOR PRODUCING FINE PARTICULATE METALS

FIELD OF THE INVENTION

The present invention relates to a process for economically producing fine particulate nickel, tin, lead, cobalt, copper or silver having a particle size of not greater than 3.0 μm with reduced amounts of impurities and oxide films.

PRIOR ART

Long-established processes for producing fine particulate metals are based on electrolysis, reduction with a reducing gas, spraying or mechanical pulverization. Fine particulate metals prepared by these processes are widely used in powder metallurgy and as coloring pigments. However, they are frequently unsatisfactory in such applications as conductive pastes, conductive adhesives, materials capable of being sintered at moderately low temperatures, porous electrodes and metallic powders for injection molding, where a demand for fine particulate metals is recently increasing and where nearly spherical finer particulate metals with further reduced impurities and oxide films are desired. To produce fine particulate metals adapted to these applications there have been proposed various processes based on reduction of a aqueous solution of various metal salts, decomposition of organic metal salts and vapor phase precipitation. By these processes, however, it is generally not easy to produce ultra-fine particulate metals having a primary particle size of not greater than 3.0 μm, and for the production of such ultra-fine particulate metals increased installation and manufacturing costs are required, and moreover, the ultra-fine products are liable to be surface-oxidized, leading to a reduction in yield.

On the other hand, although it has become possible to produce ultra-fine particulate metals having a particle size of from several tens Å to 0,5 μm by a hydrogen-plasma or vacuum evaporation methods, there is posed a problem in that the product is too active because of its ultra-fineness and is inflammable in air in addition to the expensive problem involved.

OBJECT OF THE INVENTION

An object of the invention is to provide a commercial process for economically producing substantially spherical fine particulate nickel, tin, lead, cobalt, copper or silver having a particle size of not greater than 3.0 μm with reduced amounts of impurities and oxide films.

SUMMARY OF THE INVENTION

A process for producing fine particulate metals according to the invention comprises the steps of reducing fine powder of at least one iron compound selected from the group consisting of iron oxide, iron sulfate and iron chloride with a reducing gas to provide fine particulate iron having a particle size of from 0.1 to 3.0 μm and a specific surface area of from 2.0 to 4.0 m$^2$/g, bringing the fine particulate iron in contact with an aqueous solution containing ions of at least one metal selected from the group consisting of nickel, tin, lead, cobalt, copper and silver thereby forming fine powder of at least one of said metals having a particle size of from 0.1 to 3.0 μm in the aqueous solution, and recovering the so formed fine particulate metals from the aqueous solution.

More specifically, a process for producing fine particulate metals according to the invention comprises the steps of reducing fine powder of at least one iron compound selected from the group consisting of iron oxide, iron sulfate and iron chloride with a reducing gas to provide fine particulate iron having a particle size of from 0.1 to 3.0 μm and a specific surface area of from 2.0 to 4.0 m$^2$/g, adding water to the fine particulate iron, and heating and stirring the resultant mixture to provide a slurry, adding to the heated and stirred slurry an aqueous solution containing ions of at least one metal selected from the group consisting of nickel, tin, lead, cobalt, copper and silver, heating the resulting mixture under stirring thereby forming fine powder of at least one of said metals having a particle size of from 0.1 to 3.0 μm in the aqueous solution, and recovering the so formed fine particulate metals from the aqueous solution.

BRIEF DESCRIPTION OF THE DRAWINGS

FIG. 1 is a scanning electron microscopic photo (of 5000 magnifications) of fine particulate copper produced by the process according to the invention.

DETAILED DESCRIPTION OF THE INVENTION

The process according to the invention is to produce fine particulate nickel, tin, lead, cobalt, copper or silver having a primary particle size of from 0.1 to 3.0 μm by a wet process utilizing ionization tendency of particulate iron having active surfaces of a large specific surface area, said process being characterized in that fine particulate metals are produced without carrying out any mechanical pulverization and without relying upon electrolysis, spraying, plasma and vacuum vaporization which require expensive installations and procedures.

We have found that if fine particulate iron having a particle size of from 0.1 to 3.0 μm and a specific surface area of from 2.0 to 4.0 m$^2$/g, as measured by BET method, obtained by reducing fine powder of iron oxide, iron sulfate or iron chloride with a reducing gas, is added to an aqueous solution containing ions of metals having an ionization tendency smaller than that of iron (ferrous iron:$Fe^{2+}$), including nickel, tin, lead, cobalt, copper and silver, and further palladium and platinum (wherein the aqueous solution may be that of sulfate, chloride or nitrate of said metals), fine powder of said metals having a substantially same primary particle size as that of the added particulate iron ranging from 0.1 to 3.0 μm is rapidly and easily substituted for the added particulate iron and precipitates.

The fine particulate iron used herein is reduced particulate iron prepared by reducing fine powder of iron oxide, iron sulfate and/or iron chloride with a reducing gas such as hydrogen or carbon monoxide which has a primary particle size of from 0.1 to 3.0 μm and a specific surface area of from 2.0 to 4.0 m$^2$/g. It has been found that this reduced particulate iron has a finer primary particle size and a larger specific surface area than conventional particulate iron prepared by electrolysis, reduction of mill scale, reduction of iron ores, atomizing, or pyrolysis of iron carbonyl, and in consequence, brings about such advantageous results that replacement reactions with the above-mentioned metals are likely to proceed, precipitates are nearly spherical; and the particle size of the precipitates may be controlled within a relatively narrow range.

As the aqueous solution containing ions of at least one metal selected from the group consisting of nickel, tin, lead, cobalt, copper and silver, use can be made of aqueous solutions of chlorides, sulfates and nitrates of these metals. Of these, chlorides are particularly preferred, so far as they are water-soluble or capable of being water-solubilized by complexing. The aqueous solutions of water-soluble metal chlorides may be conveniently prepared by dissolving a commercially available metal chloride the metal as such or by the aid of a suitable complexing agent in water, by reacting oxide of the metal with hydrochloric acid to form the chloride in solution, or by anodic oxidation of the metal in hydrochloric acid to form the chloride in solution.

In order to bring the fine particulate reduced iron in contact with the aqueous solution containing metal ions to effect the replacement reaction, it is convenient to initially disperse the fine particulate iron in water to prepare a thick slurry, and thereafter admixing the slurry with the above-mentioned aqueous solution containing metal ions. By doing so, dispersion of fine particulate iron in the metal ion containing aqueous solution can be promoted. Upon the admixing of the fine particulate iron slurry with the metal ion containing aqueous solution the replacement reaction begins to proceed. The higher the temperature, the thinner the concentration of metal ions, the stronger the stirring, and the faster the rate of addition of the particulate iron to the solution, there is a tendency for the finer particulate metal to precipitate. On the other hand, the larger the primary particle size of the particulate iron used, the larger particulate metal tends to precipitate the more slowly. This is believed that while the particulate metal theoretically precipitates in an amount of the same mole as that of the dissolving iron ion, as the metal precipitates on the surfaces of particles of iron, the rate of dissolution of iron decreases due to the presence of the deposited metal covering the surfaces of the iron particles.

The rate of precipitation of the metal is also affected by the presence of thin oxide films covering the particles of the reduced iron. For example, particulate reduced iron which has been prepared by reduction of iron oxide in hydrogen gas at a temperature of from 380° to 700° C., in a reduction conversion of from 90 to 99% using a rotary kiln, normally has a thin oxide film which has been formed by inevitable contact with air. While the presence of such a thin oxide film retards the beginning of the dissolution of iron, it may be readily removed by acids. Accordingly, it is effective to add a minor amount of an acid such as hydrochloric, sulfuric and nitric acids to the metal ion containing aqueous solution for a purpose of shortening the reaction period.

The configuration of the particulate metal produced by the process according to the invention depends upon that of the starting particulate reduced iron. If the starting particulate reduced iron is mono-dispersed, the resulting particulate metal is also mono-dispersed. Whereas the particulate reduced iron somewhat sintered in the form of a cluster is productive of a particulate metal in the form of a cluster. Furthermore, the shape and size of the particle of reduced iron appear to be transferred to the resulting particle of metal. It has been found that fine spheroidal particulate metal having a particle size of from 0.1 to 0.3 $\mu$m and a large specific surface area, normally ranging between 3 and 30 $m^2/g$ can be produced by using fine particulate iron having a particle size of from 0.1 to 3.0 $\mu$m and a specific surface area of from 2.0 to 4.0 $m^2/g$ which has been obtained by reducing fine powder of at least one iron compound selected from the group consisting of iron oxide, iron sulfate and iron chloride with a reducing gas.

When the replacement reaction is completed, there remains a suspension of the fine particulate metal in the aqueous medium, from which the fine particulate metal is recovered by any suitable processes for solid-liquid separation, for example, including the steps of filtration, washing and drying. In a case wherein an aqueous solution of a metal chloride has been used as the metal ion containing aqueous solution, the resulting aqueous medium is an aqueous solution of ferrous chloride, which can be advantageously processed with an equipment for recovering hydrochloric acid, which is normally installed in steel making factories, reducing the overall costs of the process according to the invention. Moreover, particulate iron oxide by-produced from the hydrochloric acid recovering equipment can be advantageously used in the process according to the invention for providing particulate reduced iron, thus enabling a desirable recycle of iron.

If the product is a particulate metal in the form of a cluster, it may be disintegrated to primary particles by bringing the clusters in collision from each other, using dry liquid energy mills, such as a commercially available jet mill. Attempts to disintegrate the clusters by means of a clasher, ball mill, vibration mill or agitator mill frequently result in failure with a result that particles are likely to agglomerate or become flaky without being disintegrated.

The fine particulate metal produced by the process according to the invention has a remarkably large specific surface area normally ranging between 3 $m^2/g$ and 30 $m^2/g$. For example, such a fine particulate nickel produced by the process according to the invention is particularly suitable for use as materials for electrodes of Ni-Cd batteries, cathode and anode of fuel cells, and metallic filters. Furthermore, in the process according to the invention contamination of the product with impurities is very little, partly because the process includes no step to be carried out at high temperatures, leading to less surface oxidation of the product, and partly because the process requires no step of ball mill pulverization that is involved in the production of particulate electrolytic copper. Thus, the process according to the invention is productive of fine particulate niclel, tin, lead, cobalt, copper, or silver of such a high quality that it is particularly suitable for use in applications, where the purity of the material is of paramount importance, such as conductive pastes, conductive adhesives, materials capable of being sintered at relatively low temperatures, porous electrodes and metallic powders for injection molding. In addition, the process according to the invention is inexpensive since it can be carried out using simple apparatus and simple processing procedures.

EXAMPLE 1

An aqueous solution of ferrous chloride from an apparatus for pickling a steel strip installed in a steel rolling factory was processed in an equipment for recovering hydrochloric acid installed in the same factory. There was by-produced particulate iron oxide of a high quality containing more than 99.9% by weight of $Fe_2O_3$ and having a particle size ranging from 0.1 to 1.0

μm. It was reduced with a hydrogen gas at a temperature of 600° C. for a period of 5 hours, using an electrically heated rotary kiln. There was obtained fine particulate reduced iron having a particle size ranging from 0.5 to 2.0 μm and a specific surface area of 3.6 m²/g, as measured by BET method, in a reduction conversion of 99%.

A stirring mill ("Atolightor" supplied by MITSUI-MIIKE Kakoki Co, Ltd.) was charged with 56 g of the particulate reduced iron and 100 g of water, and the mixture was stirred at 300 rpm for a period of 2 hours to provide a slurry.

The slurry was placed in a vessel equipped with a propeller mixer, heated to a temperature of about 80° to 90° C., and strongly stirred by means of the propeller mixer. To the slurry under stirring, 1 liter of an aqueous solution containing 280 g of nickel chloride $NiCl_2 6H_2O$ was portionwise (in 5 portions) added to the slurry, and thereafter the mixture was stirred and maintained at that temperature for a period of 30 minutes.

The suspension so obtained was allowed to stand to settle the formed particulate nickel, and the supernatant was removed. After repeating 5 cycles of washing with water-settlement-removal of supernatant, the precipitate was filtered off and dried at a temperature of 80° C. under reduced pressure for a period of 1 hour. Fine particulate nickel having a purity of more than 99% and a particle size ranging from 0.5 to 2.5 μm was obtained.

EXAMPLE 2

Particulate ferrous chloride was reduced with a hydrogen gas at a temperature of 380° C. for a period of 20 hours, using an electrically heated rotary kiln. There was obtained fine particulate reduced iron having a particle size ranging from 0.1 to 0.5 μm and a specific surface area of 2.1 m²/g in a reduction conversion of 90%. By means of the "Atolightor", 56 g of the particulate reduced iron was slurried in 100 g of water in the same manner as in Example 1. The slurry was heated to a temperature of about 80° to 90° C., and strongly stirred by means of a mixer. Under stirring, 1 liter of an aqueous solution containing 220 g of stannous sulfate $SnSO_4 2H_2O$ was portionwise (in 5 portions) added to the slurry, and thereafter the mixture was stirred and maintained at that temperature for a period of 30 minutes. The suspension so obtained was treated with 1/10N diluted hydrochloric acid to dissolve any unreacted iron oxide and thereafter there were carried out washing with water, settlement, separation, filtration and drying under reduced pressure in the manner as described in Example 1. Fine particulate tin having a purity of more than 99% and a particle size ranging from 0.1 μm to 1.0 μm was obtained.

EXAMPLE 3

Particulate ferrous sulfate was reduced with a hydrogen gas at a temperature of 500° C. for a period of 15 hours, using an electrically heated rotary kiln. There was obtained fine particulate reduced iron having a particle size ranging from 1.0 to 3.0 μm and a specific surface area of 2.7 m²/g in a reduction conversion of 98%. Fifty six grams of the particulate reduced iron was slurried in 100 g of water in the same manner as in Example 1. The slurry was heated and strongly stirred by means of a mixer. Under stirring and heating, 1 liter of an aqueous solution containing 350 g of lead nitrate $Pb(NO_3)_2$ was portionwise (in 5 portions) added to the slurry, and thereafter the mixture was processed in the same manner as described in Example 1. Fine particulate lead having a purity of more than 99% and a particle size ranging from 1.5 to 3.0 μm was obtained.

EXAMPLE 4

The particulate reduced iron prepared by reduction of the particulate iron oxide with a hydrogen gas as in Example 1 was slurried by means of the "Atolightor" in the same manner as in Example 1. The slurry was heated and strongly stirred by means of a mixer. Under stirring and heating, 1 liter of an aqueous solution containing 250 g of cobaltous chloride $CoCl_2 2H_2O$ was portionwise (in 5 portions) added to the slurry, and thereafter the mixture was processed in the same manner as described in Example 1. Fine particulate cobalt having a purity of more than 99% and a particle size ranging from 0.5 to 2.5 μm was obtained.

EXAMPLE 5

Particulate ferrous chloride was reduced with a hydrogen gas as in Example 2 to provide fine particulate reduced iron having a particle size ranging from 0.1 to 0.5 μm and a specific surface area of 2.1 m²/g in a reduction conversion of 90%. By means of the "Atolightor", an aqueous slurry containing 56 g of the particulate reduced iron was prepared, and heated and strongly stirred. Under stirring and heating, 1 liter of an aqueous solution containing 180 g of cupric chloride $CuCl_2 2H_2O$ was added to the slurry, and thereafter the mixture was processed in the manner as described in Example 2. Fine particulte copper having a purity of more than 99% and a particle size ranging from 0.1 μm to 1.0 μm was obtained.

A scanning electron microscopic photo of the obtained fine particulate copper is shown in FIG. 1. As seen from the photo, individual particles are generally spheroidal. Microscopic observation of the products obtained in other Examples revealed substantially the same results.

EXAMPLE 6

Particulate ferrous sulfate was reduced with a hydrogen gas as in Example 3 to provide fine particulate reduced iron having a particle size ranging from 1.0 to 3.0 μm and a specific surface area of 2.7 m²/g in a reduction conversion of 98%. By means of the "Atolightor", an aqueous slurry containing 56 g of the particulate reduced iron was prepared, and heated and strongly stirred. Under stirring and heating, 1 liter of an aqueous solution containing 150 g of silver chloride AgCl and 200 g of $NH_4Cl$ was added to the slurry, and thereafter the mixture was processed in the manner as described in Example 3. Fine particulate silver having a purity of more than 99% and a particle size ranging from 1.5 μm to 3.0 μm was obtained.

COMPARATIVE EXAMPLE 1

Example 5 was repeated except that the fine particulate reduced iron of Example 5 was replaced with a commercially available particulate iron having an average particle size of 74 μm and a purity of 99.8% (atomized particulate iron supplied by High Purity Chemicals Co;, Ltd.). The particulate copper obtained had an average particle size of 80.3 μm and a purity of 68%.

We claim:

1. A process for producing fine particulate metals which comprises the steps of reducing fine powder of at least one iron compound selected from the group consisting of iron oxide, iron sulfate and iron chloride with a reducing gas to provide fine particulate iron having a particle size of from 0.1 to 3.0 μm and a specific surface area of from 2.0 to 4.0 m²/g, bringing the fine particulate iron in contact with an aqueous solution containing ions of at least one metal selected from the group consisting of nickel, tin, lead, cobalt, copper and silver thereby forming fine powder of at least one of said metals having a particle size of from 0.1 to 3.0 μm in the aqueous solution, and recovering the so formed fine particulate metals from the aqueous solution.

2. A process for producing fine particulate metals which comprises the steps of reducing fine powder of at least one iron compound selected from the group consisting of iron oxide, iron sulfate and iron chloride with a reducing gas to provide fine particulate iron having a particle size of from 0.1 to 3.0 μm and a specific surface area of from 2.0 to 4.0 m²/g, adding water to the fine particulate iron, and heating and stirring the resultant mixture to provide a slurry, adding to the heated and stirred slurry an aqueous solution containing ions of at least one metal selected from the group consisting of nickel, tin, lead, cobalt, copper and silver, heating the resulting mixture under stirring thereby forming fine powder of at least one of said metals having a particle size of from 0.1 to 3.0 μm in the aqueous solution, and recovering the so formed fine particulate metal from the aqueous solution.

* * * * *